(12) United States Patent
Miller

(10) Patent No.: US 11,725,629 B2
(45) Date of Patent: Aug. 15, 2023

(54) MAGNETIC WIND TURBINE

(71) Applicant: Jeff Miller, Marshfield, WI (US)

(72) Inventor: Jeff Miller, Marshfield, WI (US)

( * ) Notice: Subject to any disclaimer, the term of this patent is extended or adjusted under 35 U.S.C. 154(b) by 0 days.

(21) Appl. No.: 17/095,568

(22) Filed: Nov. 11, 2020

(65) Prior Publication Data

US 2021/0246877 A1     Aug. 12, 2021

Related U.S. Application Data

(60) Provisional application No. 62/972,679, filed on Feb. 11, 2020.

(51) Int. Cl.
*F03D 9/25*        (2016.01)
*F03D 3/00*        (2006.01)

(52) U.S. Cl.
CPC .............. *F03D 9/25* (2016.05); *F03D 3/005* (2013.01); *F05B 2220/706* (2013.01)

(58) Field of Classification Search
CPC ... F03D 9/25; F03D 3/005; F03D 3/06; F05B 2220/706
See application file for complete search history.

(56) References Cited

U.S. PATENT DOCUMENTS

| | | | |
|---|---|---|---|
| 2004/0160062 A1* | 8/2004 | Tomas | F03D 3/0445 290/55 |
| 2011/0198855 A1* | 8/2011 | White | F03D 9/007 290/55 |

FOREIGN PATENT DOCUMENTS

CN          107288816 A    * 10/2017       F03D 17/00

OTHER PUBLICATIONS

CN 107288816-A English translation (Year: 2017).*

\* cited by examiner

*Primary Examiner* — Viet P Nguyen
(74) *Attorney, Agent, or Firm* — Andrew Morabito

(57) ABSTRACT

The present invention is a magnetic turbine, comprising, a housing, a set of blades attached to the housing, a set of magnets attached to the housing, a shaft connected to the housing, a based, wherein the base contains a system to convert rotational energy into electrical energy, a magnetic propulsion system connected to the base, and positioned relative to the set of magnets.

5 Claims, 7 Drawing Sheets

MAGNETIC WIND TURBINE

CROSS-REFERENCE TO RELATED APPLICATIONS

This application is a continuation-in-part (and claims the benefit of priority under 35 USC 120) of U.S. application No. 62/972,679 filed Feb. 11, 2020. The disclosure of the prior applications is considered part of (and is incorporated by reference in) the disclosure of this application.

BACKGROUND OF THE INVENTION

The present invention relates to wind turbine, and more particularly to a mobile wind turbine driven by magnets.

In recent years there has been a dramatic increase in the demand for energy in all forms including fuels and electricity for heating, lighting, transportation and manufacturing processes due to the world's population rapidly increasing, the supply and price-volatility problems of using petroleum and other "fossil" fuels for energy, and the accelerated technological development of large sectors of the world. Despite the construction of hydroelectric facilities and the development of fossil fuel resources at a rapid rate, it has become increasingly evident these efforts are inadequate to keep pace with the growing population's demand. First, fossil fuels such as oil and natural gas are increasingly becoming higher in cost and their availability is limited. Second, the hope that nuclear power would soon lead to a rapid solution of the energy dilemma has been tempered by environmental and safety concerns.

In the face of these growing demands and the resulting research in many fields of energy, wind energy has once again become the focus of such research, in part because the source of such energy, namely wind, is readily available to every country in the world in virtually unlimited quantities, subject only to use of wind turbines or other devices capable of converting the motive force of the wind into energy in a form usable by modern technologies. The interest in the development and harnessing of wind energy for use in homes and factories in the form of electricity is rising as with the rising costs and prices of traditional fossil fuel energy. Wind energy is also desirable because it can be converted to practical use without environmental contamination or chemical air pollution concerns.

One method of converting wind energy to practical use is through the use of a wind turbine. Traditional wind turbines, including what is historically known as a windmill, are horizontal axis wind turbines (HAWTs), wherein blades or vanes are secured to a horizontally supported shaft. As wind impinges on the blades, the horizontal shaft rotates, which rotation can then be translated into electric energy. Typically, the horizontal shaft itself pivots about a horizontal axis (hence the "horizontal axis wind turbine" name) so that the shaft and blades can pivot with the prevailing wind direction so that the shaft and blades can change their orientation as the winds change direction. One drawback to HAWTs is the inefficiencies caused by friction arising from the supported shaft. HAWT turbines utilize bearings for turning, and such bearings can wear out and need replacement. An additional drawback to HAWT turbines is that only the prevailing wind from a single direction can be "harnessed" at any one time to generate energy, so that the HAWT design can be inefficient or the blades and associated gearing can be damaged in changeable or turbulent winds, due to torque. Another drawback is that HAWT wind turbines may not turn or may need mechanical assistance to begin turning, if the wind speed is too low to counter the inertia of the HAWT rotator and bearings.

Therefore, as interest in co-generation grows, there is a need for better, more efficient renewable-energy electricity generating devices.

SUMMARY

In a first embodiment, the present invention is a magnetic turbine, comprising: a housing; a set of blades attached to the housing; a set of magnets attached to the housing; a shaft connected to the housing; a based, wherein the base contains a system to convert rotational energy into electrical energy; a magnetic propulsion system connected to the base, and positioned relative to the set of magnets.

In a second embodiment, the present invention is a magnetic turbine, comprising: a housing; a set of blades attached to the housing; a set of magnets attached to the blades; a shaft connected to the housing; a magnetic propulsion system connected to the housing, and positioned relative to the set of magnets.

Accordingly, it is an objective of the present invention a method to produce energy from a magnetic turbine, comprising: positioning a magnetic device that is capable of alternating polarity distal to a set of blades, wherein the blades have a magnetic device secured to each of the set of blades; alternating the polarity of the magnetic device relative to the positioning of the blades, wherein the magnetic device attracts the magnet attached to the blade approaching the magnetic device and repeals the magnet attached to the blade moving away from the magnetic device.

DETAILED DESCRIPTION OF THE INVENTION

Figure 1:
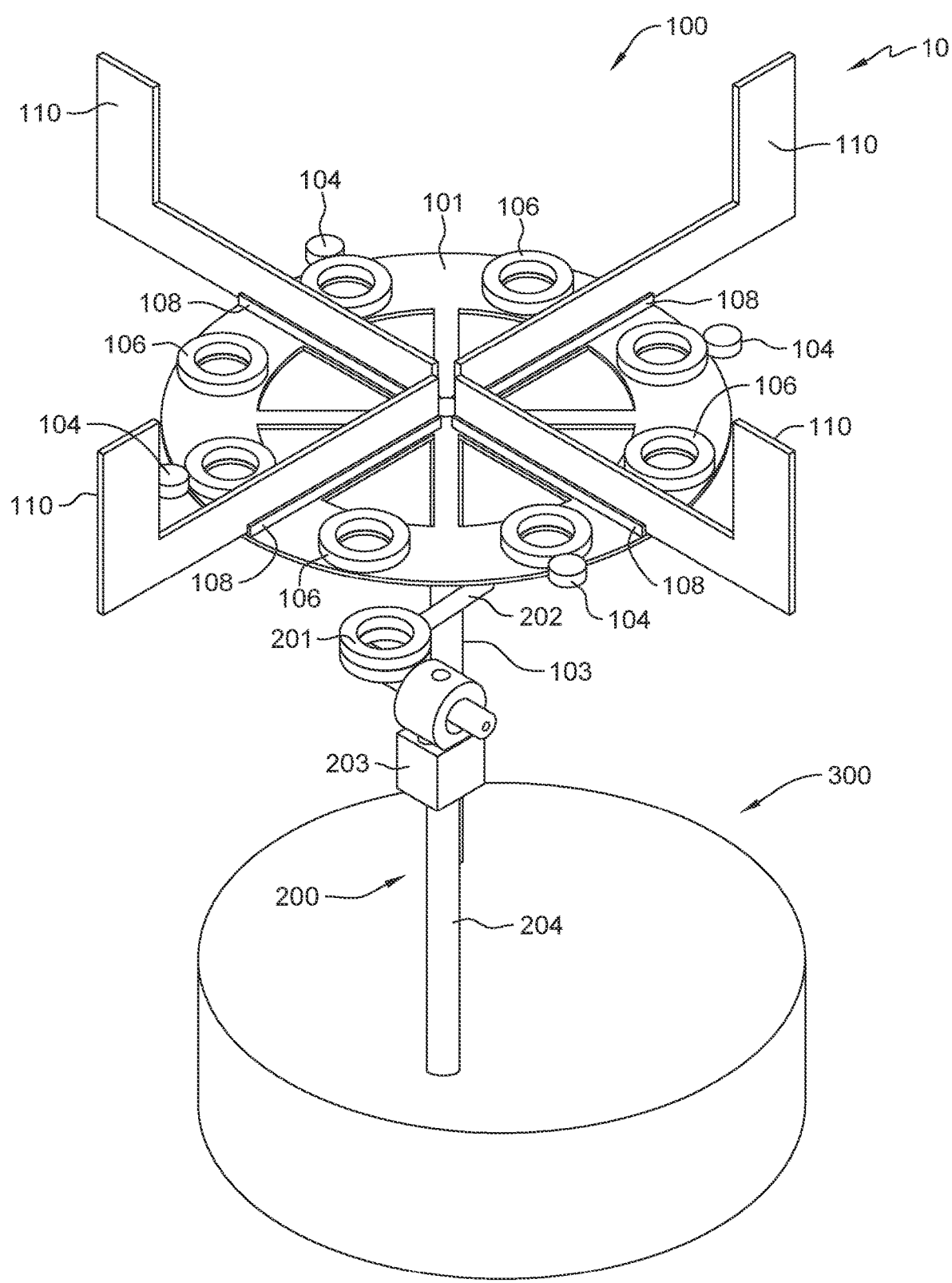
FIG. 1 depicts an isometric view of a magnetic wind turbine, in accordance with one embodiment of the present invention.
Figure 2:
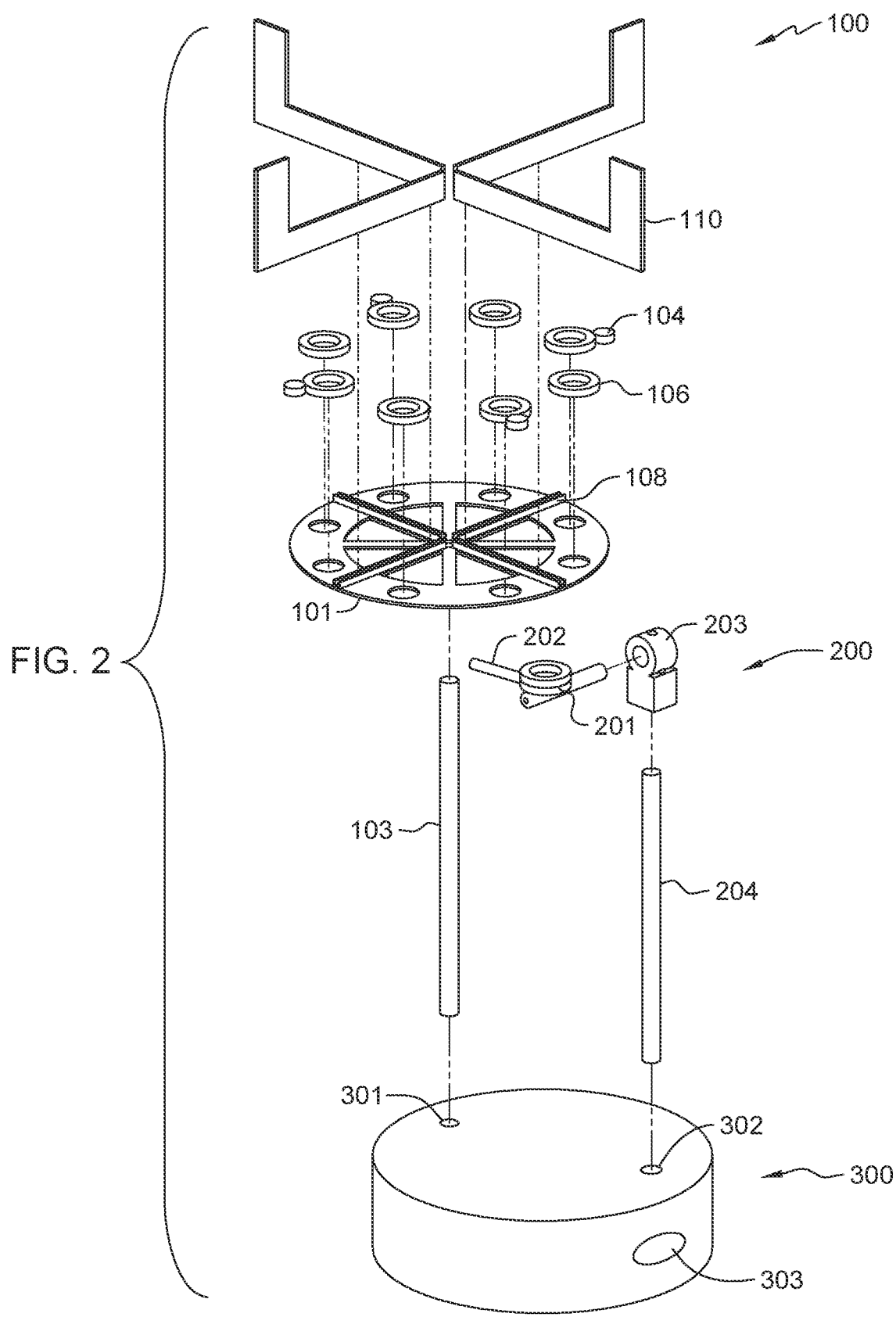
FIG. 2 depicts an exploded view of the magnet wind turbine, in accordance with one embodiment of the present invention.

The present invention provides a modular magnetic wind turbine generator that affords substantially increased energy production. The magnet wind turbines can be easily connected to other magnetic wind turbines to form a larger generation. These magnetic wind turbines can be varying in since to hand held to industrial in size. They can be located at the edge of any building structure such as walls, fences, decks, roof tops, roof peaks or in a standalone system, or also used on vehicles. For simplicity and consistency, however, the turbines will generally be referred to herein as wind turbines.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

In the detailed description of the invention, like numerals are employed to designate like parts throughout. Various items of equipment may be omitted to simplify the description. However, those skilled in the art will realize that such conventional equipment can be employed as desired.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 5:
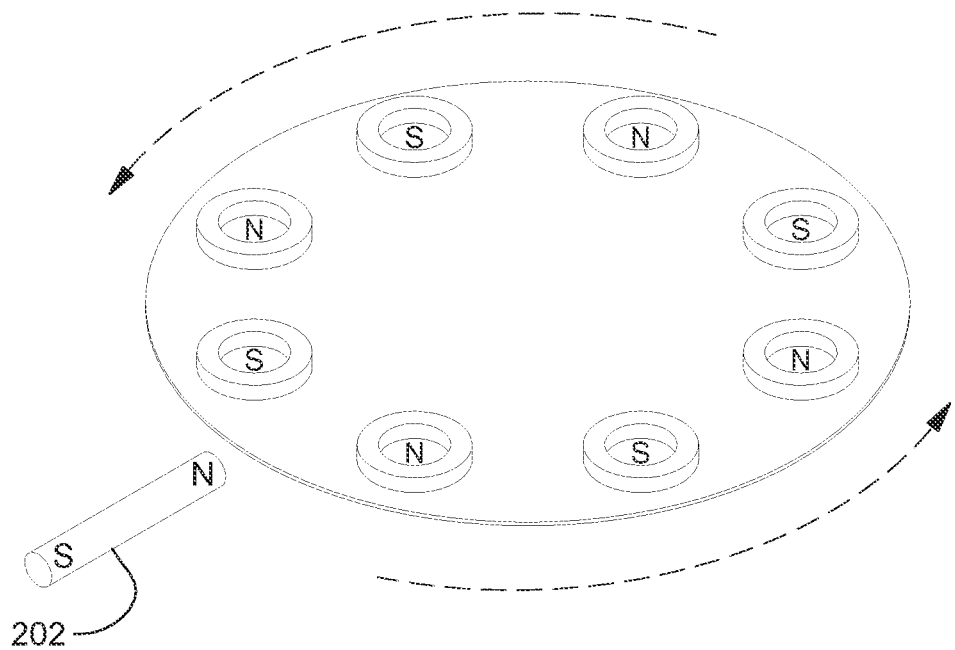
FIG. 5 depicts a schematic representation of an exemplary rotational kinetic energy conversion system, in accordance with an embodiment of the present invention.

FIG. 1 depicts an isometric view of a turbine 10, in accordance with one embodiment of the present invention. The turbine 10 is comprised of the fan assembly 100, a polarization module 200, and a base 300 which is used to house the motor which is able to take the current generated by the rotation of the turbine 10 to DC and then back to AC before it is conveyed to either electrically-powered machines (not shown), an electrical storage system, such as a batter system (not shown) or connected to a commercial electrical grid (not shown) for use by the local electrical utility. The base 300 houses the battery or electrical connections to the machine or grid as shown in FIG. 5.

The fan assembly 100 is comprised of a base plate 101 which is used as the base for the magnets and the fan blades. In the depicted embodiment the base plate 101 is shown with apertures. The apertures are designed to make the base plate 101 lightweight, and reduce costs using topology optimization. The design of the base plate 101 may be adjusted with fewer or more apertures or profiles. The base plate 101 has a plurality of fan blade holders 108. These are positioned on the base plate 101 at predetermined locations based on the design of the fan blades 110 and the types of magnets used. The fan blades 110 are of a predetermined shape, contour, and profile based on the intended use of the turbine 10. The base 101 is defined by an outer edge 109 and a central hub 105 where the central shaft 103 attached to the base 101. The central shaft 103 is used to convert the rotation energy of the base 101 to electrical energy.

Disposed along the outer edge 109 are a series of magnetics 104 extending beyond outer edge 109 and series of magnets 106 disposed on base 101. Magnets 106 which are positioned relative to magnetic 104. In the depicted embodiment, the magnets 104 and 106 are spaced a distance of 0.05 inches apart from one another and are of opposing poles. The fan blades 110 are positioned distal to the magnets 104 and magnets 106 to create a continuous attraction/repel from of the magnets. In the depicted embodiment, the magnets 104 and 106 are alternating around the base 101. This creates alternating position and negative forces produced by the magnets.

The base 300 provides the support for the fan assembly 100, where the central shaft 103 is rotatably connected to the power conversion module housed within the base 300. The central shaft 103 is directly connected to the power conversion module, and passes through base 300 through opening 301. Thus when the fan assembly rotates, the rotation energy is converted to electrical energy.

Secured to base 300 is the polarization module 200 through shaft 204, which is connected to a motor to adjust the positioning of the polarization module 200. The polarization module 200 is used to create the repulsion forces between the magnets thus contributing to the inertia and centrifugal forces to the kinetic energy of the design. The polarization module 200 is comprised of shaft 204, holder 203, magnet assembly 201. The shaft 204 is connected to a motor to adjust the positioning of the magnet assembly 201 and is secured through opening 302 of the base. The shaft is connected to the holder 203 which is used to secure the magnet assembly 201 in the required position to create the required repulsion forces between the magnets. The magnet assembly 201 is an electromagnet system which is able to produce alternating polarity. Through the use of an electromagnet, the magnet 202 is able to attract and repel the magnets 104 and 106 as desired to increase the centrifugal forces of the fan assembly 100. The magnet 202 is secured and positioned related to magnets 104 and 106 so as the base 101 rotates, the electromagnet assembly 201 is able to change the polarity of magnet 201 to assist in the rotation of the base 101. Through the use of an electric current the intensity, force, and polarity of the magnet 202 is adjusted. This may occur by the changing of the current of the of the electromagnet assembly 201 which alters the polarity of the magnet 202. This can be used to further increase the speed of which the base 101 rotates, to compensate for a lack of a rotation from the fan blades 110 interacting with the wind, or to increate the kinetic energy produced by the rotation of the central shaft 103.

Figure 6:
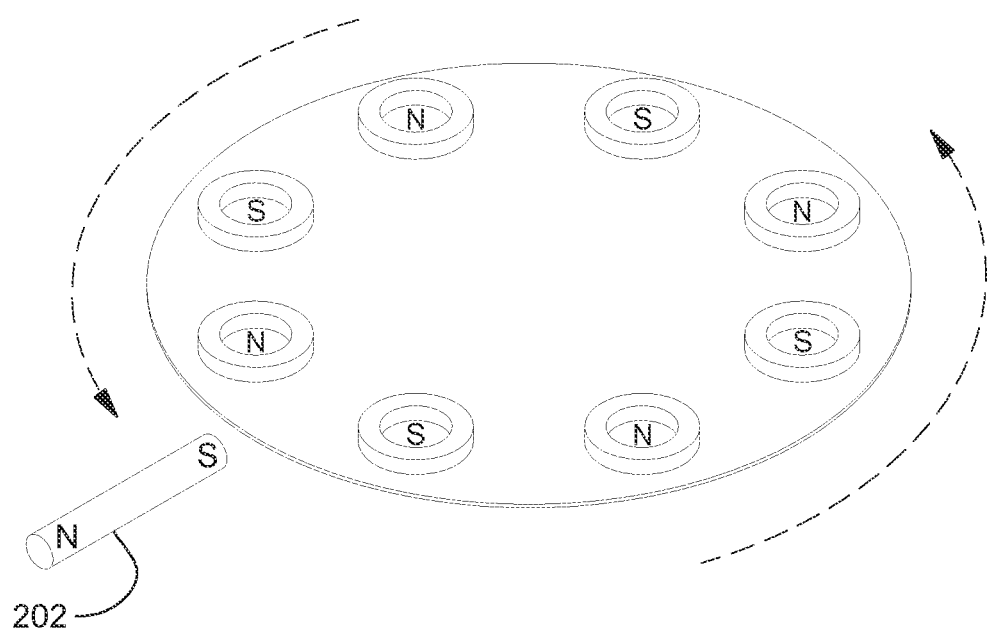
FIG. 6 depicts a schematic representation of an exemplary rotational kinetic energy conversion system, in accordance with an embodiment of the present invention.

As shown in FIGS. 5 and 6, an example of the magnets repulsion and attraction is shown. Due to the fan blades 110, the base 101 rotates counterclockwise. The magnets are shown in alternating polarity ("N" and "S") and the magnet 202 is shown in two different states. In FIG. 5 the magnet 202 is shown with a North end directed towards the base 101, thus as the base rotates, the magnet 202 attracts the "S" magnet attached to the base, and repeals the "N" magnet, thereby increasing the kinetic energy of the base 101. As the magnet attached to the base 101 passes the magnet 202, the polarity of the magnet is reversed, and the magnet 202 will repel the magnet which just passed by, and will attract the next magnet on the base 101. This process is repeated and the flipping or reversing of the polarity of magnet 202 is adjusted based on the rotation speed of the base 101.

This design of the magnets creates an induced rotation of the base 101 based on the continuous repel and attraction of the differing magnets polarization. Combined with the forced turning of the base 101 by the wind, the turbine 10 is able to generate more energy due to the increased rotation forces of the central shaft 103. Additionally, the magnets are able to continue the rotation force even when the wind power drops below the necessary velocity to turn the vanes 110.

The shaft 204 and magnet 202 is able to be adjusted both in position and strength. Based on the design of magnet 106A and the voltage applied to the magnet 106A, the strength of this magnet can be increased or decreased to both increase the attraction or repel of the magnets.

Figure 7:
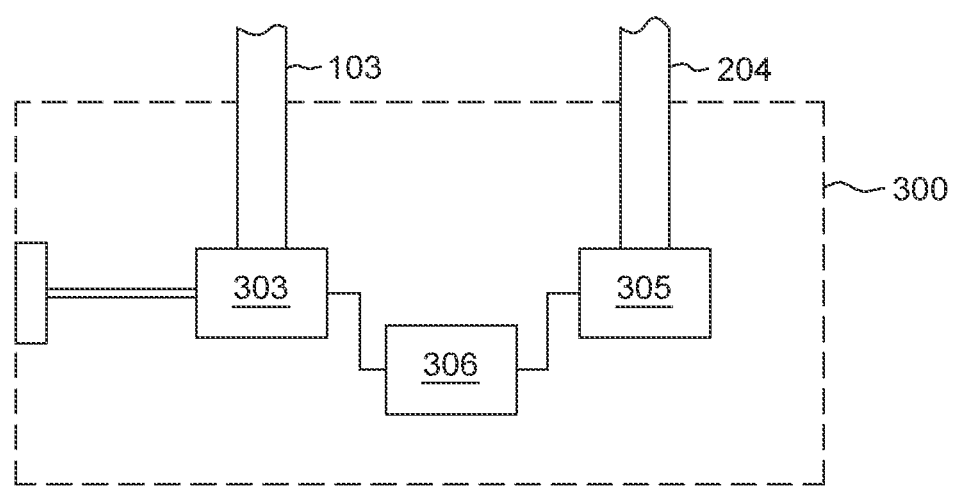
FIG. 7 depicts a block diagram depicting a computing environment, in accordance with an embodiment of the present invention.

FIG. 7 depicts a block diagram of a computing environment 100 in accordance with one embodiment of the present invention. FIG. 1 provides an illustration of one embodiment and does not imply any limitations regarding the environment in which different embodiments maybe implemented. As shown in the depicted embodiment, central shaft 103 is connected to turbine generator 303, which converts the rotation of central shaft 103 into energy which is accessible through port 304. Shaft 204 is connected to motor 305. Motor 305 is able to rotate shaft 204 to adjust the positioning of the magnet 202. This provides for the variability of the positioning of the magnet 202 which will affect the magnetic attraction of the magnets. In some instances where the fan blades 110 are able to produce adequate rotational forces to generate the desired power, the magnet is not needed to assist in this, and is moved away from the base 101. Computing unit 306 (shown in FIG. 8) is able to communicate with the turbine generator 303 and the motor 305 to determine, based on the energy produced by the turbine generator 303 and the rotation of central shaft 103 if the shaft 204 should be rotated to relocate the magnet 202, or if the magnet 202 intensity or power needs to be adjusted, and also the speed at which the magnet 202 reverse poles.

Figure 8:
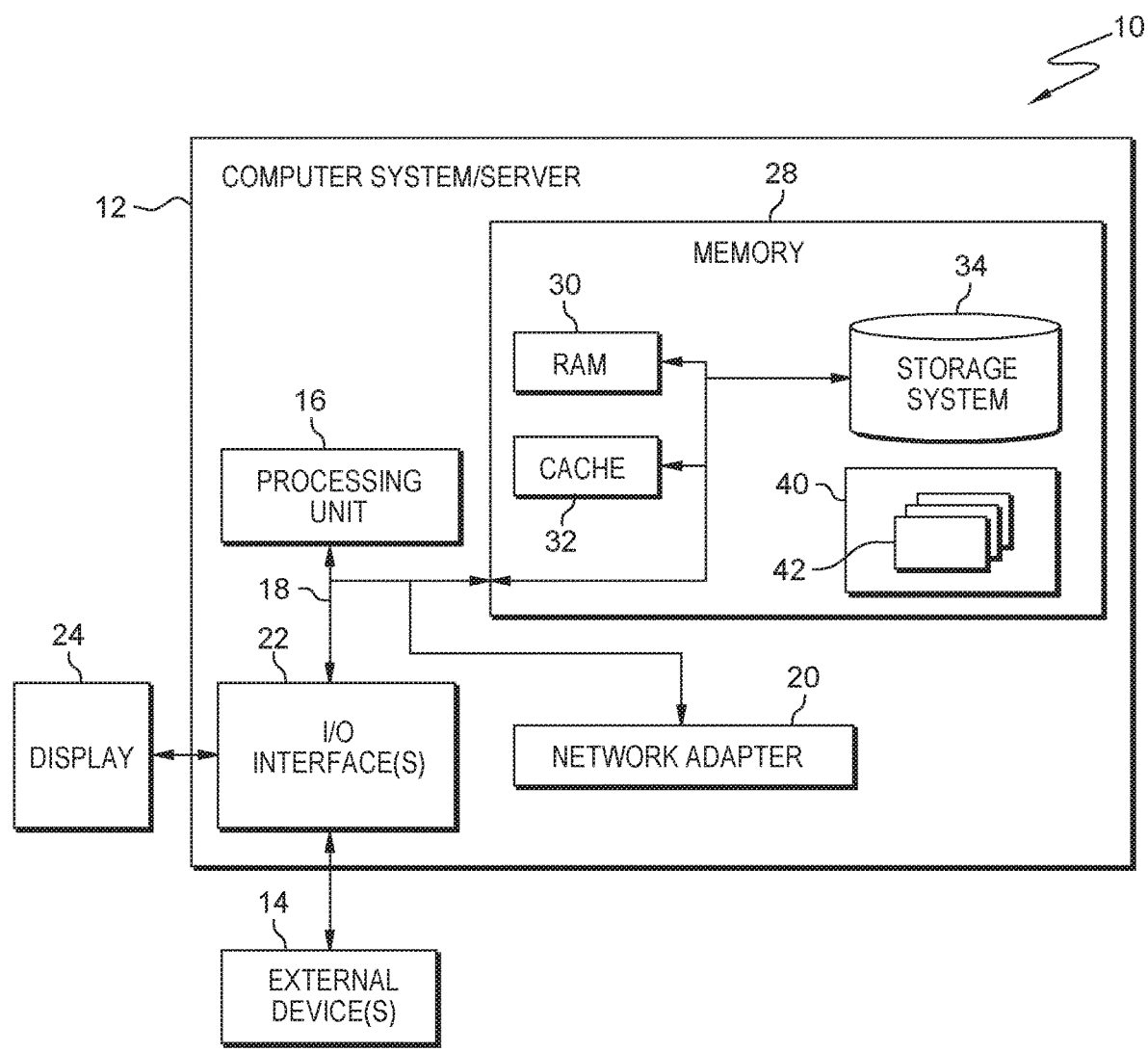
FIG. 8 depicts a computing device, in accordance with an embodiment of the present invention.

As shown in FIG. 8, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
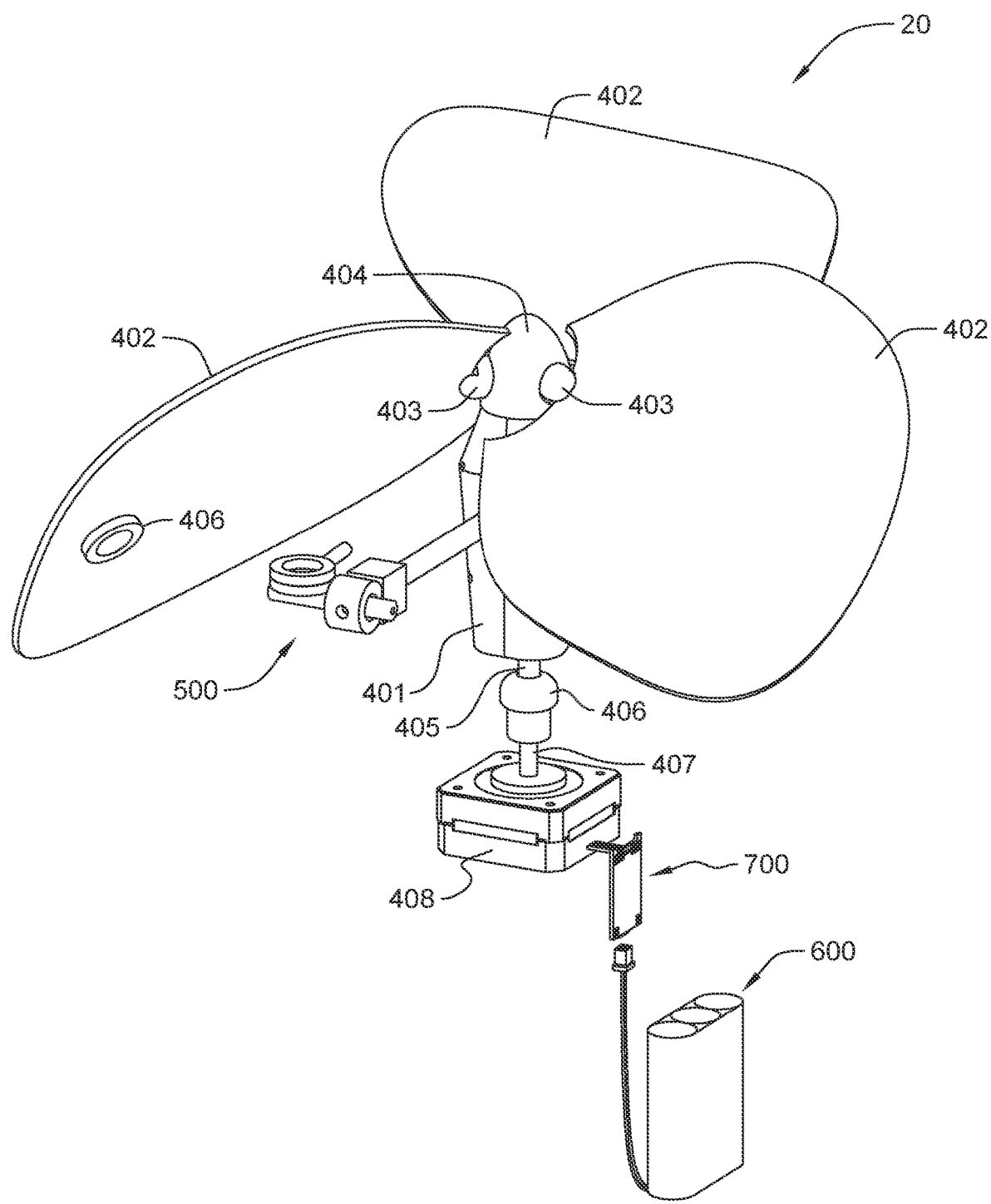
FIG. 3 depicts an isometric view of a magnet wind turbine, in accordance with another embodiment of the present invention.
Figure 4:
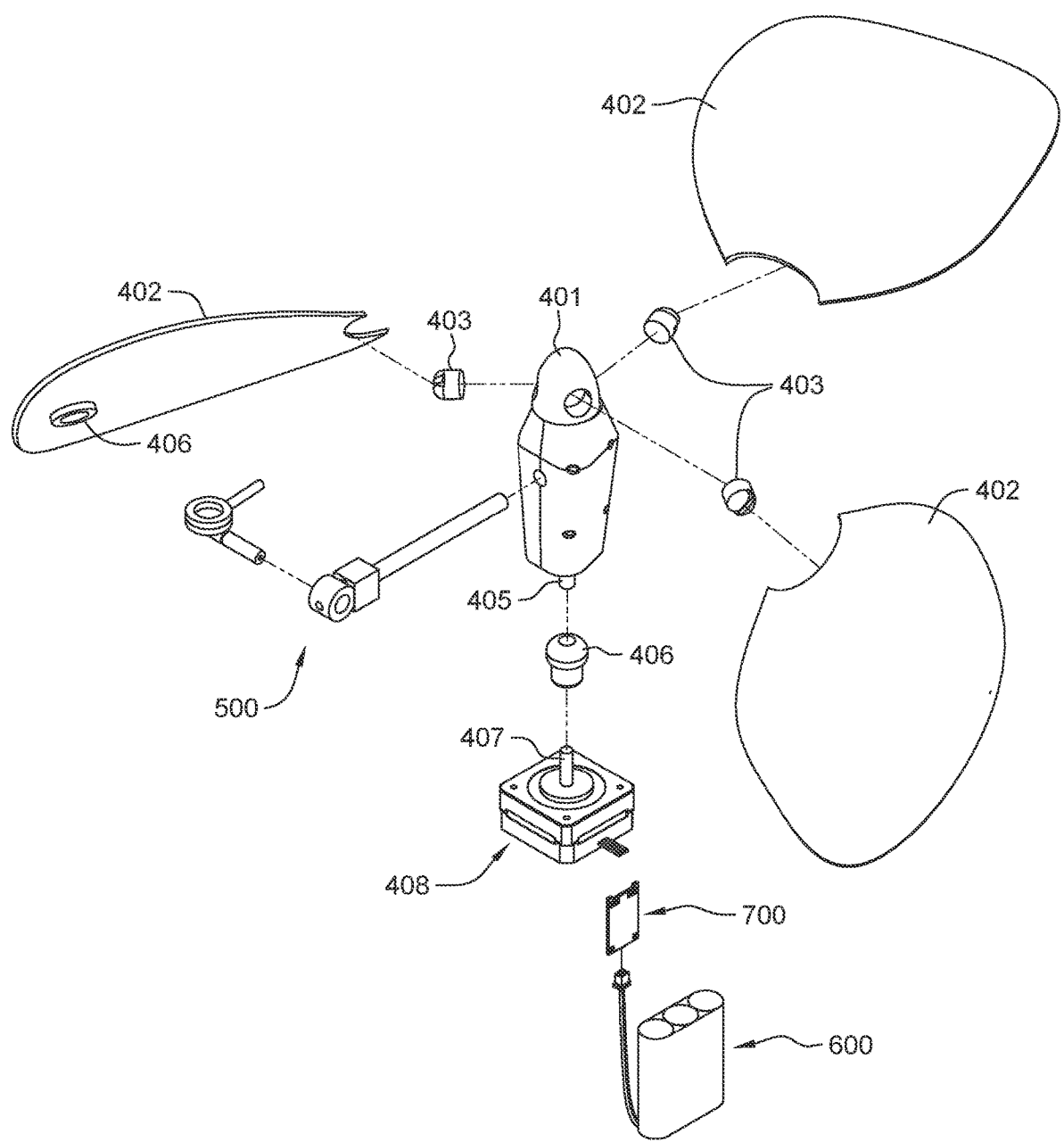
FIG. 4 depicts an exploded view of the magnet wind turbine, in accordance with another embodiment of the present invention.

FIGS. 3 and 4 depict a second embodiment of a turbine 20, in accordance with one embodiment of the present invention. The turbine 20 has a body 401 with a rotatable nose 404 with fan blades 402 which are mounted to the nose 404 through mounts 403. The magnetic propulsion module 500 is integrated into the body 401 and is positioned to interact with magnets 406 which are secured to the fan blades 402.

The magnetic propulsion module 500 through shaft 204, which is connected to a motor to adjust the positioning of the magnetic propulsion module 500. The magnetic propulsion module 500 is used to create the repulsion forces between the magnets thus contributing to the inertia and centrifugal forces to the kinetic energy of the design. The magnetic propulsion module 500 is comprised of shaft 204, holder 203, magnet assembly 201. The shaft 204 is connected to a motor to adjust the positioning of the magnet assembly 201 and is secured through opening 302 of the base. The shaft is connected to the holder 203 which is used to secure the magnet assembly 201 in the required position to create the required repulsion forces between the magnets. The magnet assembly 201 is an electromagnet system which is able to produce alternating polarity.

The nose 404 is connected to shaft 405 which is coupled 406 to shaft 407 which is connected to the turbine generator 408 to convert the kinetic energy of the magnets shaft into electrical energy, which can then be used to power a battery 600 through connector 700. turbine generator 408 may convert DC to AC which is then transferred through turbine generator 408 to the output. The batteries 600 are for exemplary purposes and may be electrically-powered machines (not shown), or connected to a commercial electrical grid (not shown) for use by the local electrical utility.

The magnetic propulsion module 500 is an electromagnetic assembly designed to have reverse polarization as the magnet attached to the fan blades 402. Through the adjustment of the magnetism of the magnetic propulsion module 500, the magnetic propulsion module 500 is able to speed up the rotation of the fan blades 402 due to the repulsion of the magnetic propulsion module 500 and the magnet 202. This provides for an alternative force to rotate the fan blades 402 if the wind is not present, or to increase the rotation of the fins 301. The magnetic propulsion module 500 may maintain a constant gauss-oersted value or may fluctuate based on the location of the fan blades 402, the strength of the magnet 202, the rotational velocity of the fan blades 402.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A magnetic turbine, comprising:
a housing;
a set of non-magnetic blades attached to an upper surface of the housing;
a set of magnets attached to the housing, wherein the set of magnets are positioned along an outer edge of the housing, and the set of magnets are alternating polarity;
a base, wherein the base contains a system to convert rotational energy into electrical energy;
a shaft rotatably connected to the system to convert rotational energy into electrical energy and the housing;
a magnetic propulsion system positioned below the housing and a predetermined distance from the set of magnets;
a second shaft connected to the magnetic propulsion system and the base;
wherein the magnetic propulsion system further comprises an electromagnet assembly and a magnet and wherein the electromagnet assembly is able to alter polarity of the magnet, wherein the magnet attracts and repels the set of magnets attached to the housing.

2. The magnetic turbine of claim 1, wherein the set of non-magnetic blades are spaces substantially equal distances from one another.

3. The magnetic turbine of claim 1, wherein the set of magnets are spaces substantially equal distances from one another based on a center point of the housing.

4. The magnetic turbine of claim 1, wherein the electromagnet assembly adjusts the gauss-oersted value of the magnet.

5. A magnetic turbine, comprising:
a base, wherein the base contains a first system to convert rotational energy to electrical energy and a second system to change the polarity of a magnet;
a first shaft connected to the base and the first system to convert rotation energy to electrical energy, wherein the first shaft is able to rotate;
a second shaft connected to the base and to the second system;
wherein the second system comprises a magnet assembly, wherein the magnet assembly is able to change the polarity of the magnet;
a fan assembly attached to the first shaft, wherein the fan assembly comprises,
a base plate having a plurality of blade holders, wherein the base plate is attached to the first shaft,
a set of non-magnetic blades attached to the blade holders, wherein the blades face away from the base, and
a set of magnets attached to the base plate, wherein the set of magnets are positioned with alternating polarity along an outer edge of the base plate; and
wherein the magnet assembly is positioned relative to the set of magnets, so that a magnetic field of the magnet assembly and the set of magnets are able to interact and wherein the magnet assembly is positioned below the base plate so that it does not interfere with the set of non-magnetic blades.

\* \* \* \* \*